United States Patent

Moon

[11] Patent Number: 6,034,824
[45] Date of Patent: Mar. 7, 2000

[54] PROJECTION LENS

[75] Inventor: Hee Jong Moon, Seoul, Rep. of Korea

[73] Assignee: LG Electronics, Inc., Seoul, Rep. of Korea

[21] Appl. No.: 09/025,105

[22] Filed: Feb. 17, 1998

[30] Foreign Application Priority Data

Feb. 17, 1997 [KR] Rep. of Korea .......................... 97-4744

[51] Int. Cl.[7] .............................. G02B 9/12; G02B 13/18
[52] U.S. Cl. ............................................ 359/651; 359/716
[58] Field of Search ..................... 359/649, 650, 359/651, 716

[56] References Cited

U.S. PATENT DOCUMENTS

| | | | |
|---|---|---|---|
| 4,300,817 | 11/1981 | Betensky | 350/412 |
| 4,348,081 | 9/1982 | Betensky | 350/412 |
| 4,526,442 | 7/1985 | Betensky et al. | 350/412 |
| 4,685,774 | 8/1987 | Moskovich | 350/432 |
| 4,697,892 | 10/1987 | Betensky | 350/432 |
| 4,776,681 | 10/1988 | Moskovich | 350/432 |
| 4,801,196 | 1/1989 | Betensky | 350/432 |
| 4,948,237 | 8/1990 | Hirata et al. | 350/432 |
| 5,633,757 | 5/1997 | Park | 359/650 |

FOREIGN PATENT DOCUMENTS

| | | |
|---|---|---|
| 57-108818 | 7/1982 | Japan . |
| 61-067812 | 4/1986 | Japan . |
| 8-015607 | 1/1996 | Japan . |

*Primary Examiner*—Scott J. Sugarman
*Attorney, Agent, or Firm*—Fleshner & Kim

[57] ABSTRACT

A projection lens for projecting, on a projection screen, an enlargement of an image appearing on a cathode ray tube (CRT) corrects for optical aberrations by minimizing the number of lens elements, and can be manufactured at low cost. The projection lens includes, successively from an image side to an object side, a first lens group comprising a single lens element of generally positive meniscus shape, a second lens group comprising a single positive lens element, a field stop, and a third lens group having a concave surface facing the image side.

24 Claims, 11 Drawing Sheets aberration distance(mm)

longitudinal spherical aberration field curvature (height)

longitudinal spherical aberration field curvature (height)

PROJECTION LENS

BACKGROUND OF THE INVENTION

1. Field of the Invention

The present invention relates to a projection lens and, more particularly, to a projection lens for projecting an enlargement of an image appearing on a cathode ray tube (CRT) on a screen to provide a clear image through correction of optical aberrations using a low number of lens elements.

2. Background of the Related Art

Related projection lenses for a wide screen television are disclosed in U.S. Pat. No. 4,300,817 to Betensky (Betensky '817), U.S. Pat. No. 4,384,081 to Kubo, et. al. (Kubo '081), and U.S. Pat. No. 4,526,442 to Betensky, et. al (Betensky '442).

The related projection lenses, which are generally designed for a CRT, generally include three lens units. The three lens units are generally a first lens unit with at least one aspheric surface disposed at the foremost end of a screen for correcting aberrations, a second lens unit having a biconvex lens element of positive power, and a third lens unit that functions as a field flattener and that has a concave lens element to correct a Petzval curvature of the lens.

The lens units, which are also called lens groups, each have specific optical functions and are disposed such that the one or more individual optical elements that make up the lens unit are spaced from each other by a predetermined distance. The specific optical functions of each lens unit or lens group in the overall lens system are performed by one or more lens elements. The number of lens elements in each lens unit or lens group depends on the required optical information or required optical functions.

Other factors that influence the number of lens elements in each lens unit include the desired optical performance of the lens, cost constraints, and size constraints. A lens unit, or a lens group, is defined as one or more lens elements that enable an optical function in the overall lens system.

In Betensky '817, a second lens unit is disclosed with one biconvex lens element, and an equivalent focal length (EFL) of the overall lens system disclosed is 127 mm or greater. In Kubo '081, a second lens unit includes a biconvex lens and is used in a direct projection lens for a CRT with a diameter of 5 inches. The second lens unit is designed to reduce the equivalent focal length of the overall projection lens to 85 mm.

In Betensky '442, folding means are inserted between a first lens unit and a second lens unit to fold the optical axis. Also, the equivalent focal length of the overall lens system is 126 mm or less, which makes the lens system suitable for a CRT screen with a diameter of 5 inches.

A projection television (TV) set requires a cabinet with a large volume in order to accommodate a large screen. A recent trend has been to minimize the volume of the cabinet while still accommodating a large screen and maintaining a clear image quality. In order to reduce the volume of the cabinet, methods have been proposed for reducing the equivalent focal length of the overall projection lens system. If the equivalent focal length of the projection lens is reduced, a field angle of the projection lens is increased.

The equivalent focal length of the projection lens has a functional relationship with the overall distance between the CRT and the screen as shown in equation (1) below:

$$OL = EFL\left(1 + \frac{1}{M}\right) + EFL(1 + M), \quad (1)$$

where OL is the overall length between an object and an image, EFL(1+1/M) is a distance between the object and a second principal point of the lens, EFL(1+M) is a distance between the object and a first principal point of the lens, and M is the magnification of the lens system, i.e., the ratio of the height of the image to the height of the object.

As illustrated in equation (1), it is necessary to reduce the equivalent focal length or to increase the field angle of the lens in order to reduce the overall distance between the CRT and the screen. However, reducing the equivalent focal length or increasing the field angle makes it difficult to correct for optical aberrations.

Another method involves enlarging a space between a fluorescent screen of the CRT and a third lens unit of the projection lens. However, this method requires a liquid coolant, for cooling a fluorescent plane of the CRT, a coupling material, and a housing for containing the liquid coolant. Furthermore, if the fluorescent plane of the CRT is enlarged, the concave-shaped third lens unit must have high negative power. As a result, the optical power of the convex-shaped second lens unit must be increased.

Since most CRT fluorescent screens include a convex lens to increase the brightness of corner portions of the CRT system, the optical power of the third lens unit must be reduced to correct the field curvature. However, it is difficult to obtain a margin angle required to correct astigmatism and distortion with a second lens unit that has one biconvex element.

U.S. Pat. No. 4,348,081 to Betensky (Betensky '081) discloses techniques for correcting astigmatism and distortion. As disclosed in Betensky '081, better correction of aberrations can be achieved by dividing the optical power of the second lens unit at a short focal length. However, if the optical power of the second lens unit is merely divided into two, in order to obtain the margin angle, the available use angle of the projection lens system exceeds 72 degrees. As a result, it is difficult to obtain sufficient resolution and contrast.

Betensky '817 teaches that a large sized projection TV for home use can be manufactured. Accordingly, much attention has been given to the development of a projection lens that has a wide field angle, and that can be manufactured at low cost. Such a projection lens can reduce the size of a TV system, while maintaining or increasing the size of the viewing screen.

U.S. Pat. No. 4,948,327 to Hirata et. al. (Hirata '237) and U.S. Pat. No. 4,697,892 to Betensky (Betensky '892) disclose projection lenses that are designed to reduce the focal length of the overall lens by dividing the complex second lens unit into two or more lens elements. The techniques taught in Hirata '237 and Betensky '892 are currently applied to wide screen projection lens systems with focal lengths of 80 mm or less. These projection lens systems have a high positive optical power due to the second lens unit, and have an increased field angle so that correction of field curvature aberration can be easily achieved. This results in good optical performance.

However, in the projection lens systems disclosed in Hirata '237 and Betensky '892, the second lens unit must have convex element with a large diameter. In addition, the second lens unit must have a significantly long front vertex distance (FVD) for appropriate correction of field curvature aberration and astigmatism. The front vertex distance is the distance between an image of the first lens unit and the plane of the CRT.

U.S. Pat. No. 4,801,196 to Betensky (Betensky '196), discloses a projection lens that includes a first lens unit comprised of a single lens element with two aspheric surfaces and an overall positive meniscus shape, a second positive lens unit, and a third lens unit with a strongly negative concave surface facing an image end. The first lens unit is of positive optical power at the optical axis of the lens. However, due to the aspheric power of the surfaces, the positive optical power of the first lens unit decreases with increasing radial distance from the optical axis, and may become strongly negative at or closely adjacent to the clear aperture of the first lens unit.

The strong negative power of the third lens unit contributes to correction of the Petzval sum of the other lens elements. The strongly concave surface may be made aspheric to also correct for residual astigmatism and field curvature of the lens. The second lens element provides the majority of the positive power of the lens system and some astigmatism correction. The first lens unit must then correct the aperture-dependent aberrations, particularly spherical aberration and coma The lens systems described in Betensky '196 are very compact due to the close spacing between the first and second lens units. These lens systems may have a field angle as great as 73 degrees, while comprising only three elements.

The lens elements disclosed in Betensky '817 are made of acrylic material on which aspheric surfaces may be easily formed. However, the refractive index of acrylic varies significantly with temperature. This leads to a change in focal length of the acrylic lens elements which, in turn, can lead to defocusing of the overall lens system.

A method has been disclosed for designing a mount and a barrel for the lens system, using a bimetallic plate or other means, that shifts the position of the lens system relative to the CRT in order to maintain the focus of the lens system during temperature changes.

Kubo '081 addresses the temperature problem by minimizing the variation of the optical power with changing temperature. This is accomplished by using a glass material to make the second lens unit or the power lens. A problem with this method is the high expense involved in forming an aspheric surface on glass.

To solve the expense problem, a hybrid lens system has been disclosed that comprises a power unit made of a glass material, and an additional acrylic corrector with one or more aspheric surfaces adjacent to the second lens unit or the power unit. However, it is difficult to provide a hybrid lens system with a wide field angle and short length.

U.S. Pat. No. 4,776,681 to Moskovich (Moskovich '681) addresses the hybrid lens problem. FIG. 1 shows one of the embodiments disclosed in Moskovich '681, in which aspheric surface lenses made of a plastic material are used. However, as illustrated in FIGS. 2A–2C, aspheric surface lenses made of plastic cannot achieve sufficient correction of chromatic aberration. Further, the lenses disclosed in Moskovich '681 have been designed and developed for the peak wavelength of a green CRT, i.e., the e-line (546.0 nm). Since such lenses are also applied to both a red CRT and a blue CRT, the lenses do not perform optimally.

As illustrated in the longitudinal spherical surface aberration plots of FIG. 2A, a peak wavelength f-line (490.0 nm) of the blue CRT, a peak wavelength d-line (590.0 nm) of the red CRT, and a peak wavelength e-line (546.0 nm) of the green CRT are out of the center of aberration. This results in deterioration of the optical lens system performance. As illustrated in the field curvature aberration plots of FIG. 2B, it is difficult to correct coma aberration and field curvature aberration due to sagittal (S) and tangential (T) field curvature in the center of the aberration distance. This results in distortion, as illustrated in FIG. 2C.

FIGS. 3A–3C show spectral characteristics of green, blue, and red CRTs. The spectral characteristics and chromatic aberration occur because each CRT emits light at a peak wavelength and at other wavelengths within its emission band. The overall image quality exhibited by a projection TV depends mainly on the green lens assembly. This is because, as illustrated in FIG. 3A, the green CRT emits light at wavelengths that fall within the blue and red wavelength bands. Thus, the projection lens must correct the chromatic aberration in the blue and red wavelength bands. Since non-corrected chromatic aberration causes deterioration in picture quality and contrast it is necessary to correct the chromatic aberration for High Definition Television (TV) and high definition video projectors.

The respective lens units are denoted by a reference code G and are numbered in series from an image side to an object side of the lens system. The reference code CR denotes the correction lens unit. The lens elements are denoted by a reference code L and are numbered in series from an image side to an object side of the lens system. The surfaces of the respective lens elements are denoted by a reference code S and are numbered in series from an image side to an object side of the lens system. The reference code CS denotes a CRT screen. The reference code OC denotes a liquid optical coupler between the CRT screen CS and the lens system.

The first lens unit G1 includes a meniscus-shaped lens element of positive optical power. The first lens unit G1 has at least one aspheric surface defined by equation (2) below:

$$x = \frac{Cy^2}{1 + [1 - (1+K)Cy^2]^{\frac{1}{2}}} + Dy^4 + Ey^6 + Fy^8 + Gy^{10} + Hy^{12} + Iy^{14}, \quad (2)$$

where x is the surface sag at a semi-aperture distance y from the axis A of the lens element, C is a surface curvature of the lens element at the optical axis, K is a conic constant, and D, E, F, G, H, and I are aspheric surface coefficients.

The first lens unit $G_1$ is more convex than the second lens unit $G_2$, and thus consists of a meniscus-shaped lens element having a small space. The second lens unit $G_2$ includes a biconvex lens element having biconvex surfaces $S_3$ and $S_4$, and is made of a glass material to minimize the variation of its optical power with changing temperature. The third lens unit $G_3$ acts as a field flattener and has the same Petzval curvature as the first lens unit $G_1$ and the second lens unit $G_2$. The third lens unit $G_3$ has a negative optical power, and includes a spherical surface and an aspheric surface.

The distance $d_{12}$ between the first lens element $L_1$ of the first lens unit $G_1$ and the second lens element $L_2$ of the second lens unit $G_2$ is an important factor in correcting the field curvature aberration. Specifically, the distance $d_{12}$ has to satisfy equation (3) below:

$$0.10 < |d_{12}/f_3| < 0.48, \quad (3)$$

where f3 is the focal length of the third lens unit $G_3$.

If $|d_{12}/f_3|$ is 0.10 or less, the field curvature is overcorrected and an image does not appear. On the other hand, if $|d_{12}/f_3|$ exceeds 0.48, it become difficult to correct the field curvature aberration, and an image does not appear. Furthermore, as the field angle of the lens system gets smaller, the astigmatism of the lens system gets higher. Such astigmatism can be corrected by correcting the optical aberration in the second lens unit $G_2$.

The coma aberration, the astigmatism, and the optical aberration in the second lens unit $G_2$ should be corrected in such a manner that the lens element $L_1$ of the first lens unit $G_1$ has two aspheric surfaces $S_1$ and $S_2$. The optical power of lens element $L_1$ is positive at the optical axis, but goes down with increasing radial distance from the optical axis.

The rate of change of the optical power along the radial distance of the lens element $L_1$ is dependent on the optical aberration being corrected. The spherical optical power Kca/ka of the first lens element $L_1$ around its effective aperture, or at the optical axis thereof, is disclosed in U.S. Pat. No. 4,685,774 to Moskovich (Moskovich '774).

The positive optical power at the optical axis is reduced, depending on the height Y from the optical axis, to negative optical power with an absolute value of at least 2.5 times the optical power at the optical axis. The spherical optical power Ky of lens element $L_1$ can be expressed as follows:

$$K_Y = (n-1)(C_{1Y} - C_{2Y}), \qquad (4)$$

where n is the optical power of lens element $L_1$, $C_{1Y}$ is the curvature of the first lens surface $S_1$ between the optical axis A and the height Y, and $C_{2Y}$ is the curvature of the second lens surface S2 between the optical axis A and the height Y.

However, such a lens element has several problems in that it exhibits the longitudinal spherical aberration shown in FIG. 2A. That is, the peak wavelength F-line (490.0 nm) of the blue CRT, the peak wavelength d-line (590.0 nm) of the red CRT, and the peak wavelength e-line (546.0 nm) of the green CRT are away from the center of the aberration distance. As a result, significant chromatic aberration occurs. In addition, as illustrated in FIG. 2B, the sagittal field curvature S and the tangential field curvature T in the center of the aberration distance prevents the correction of the coma aberration and the correction of the field curvature aberration, and causes the distortion illustrated in FIG. 2C. Since such chromatic aberration deteriorates the resolution and contrast of the lens system, the lens system of FIG. 1 is not suitable for HDTV and video projectors.

SUMMARY OF THE INVENTION

Accordingly, the present invention is directed to a projection lens that substantially obviates one or more of the problems of the related art.

An object of the present invention is to provide a projection lens capable of achieving the horizontal resolution required for HDTV through correction of optical aberration using a simple lens structure that utilities a small number of lens elements.

Another object of the present invention is to provide a projection lens which utilizes a plastic aspheric lens that can easily be manufactured at low cost by applying an aspheric surface to a plastic lens and smoothing the aspheric surface.

Another object of the present invention is to provide a projection lens with improved pick-up performance and improved brightness, and that can be used with a red CRT, a blue CRT, and a green CRT.

The present invention can be achieved in whole or in part by a projection lens comprising, successively from an image side to an object side, a first lens group comprising a single lens element of generally positive meniscus shape, a second lens group comprising a single positive lens element, a field stop, and a third lens group having a concave surface facing the image side.

The present invention can also be achieved in whole or in part by a projection lens comprising, successively from an image side to an object side, a field stop, a first lens group comprising a single lens element of generally positive meniscus shape, a second lens group comprising a single positive lens element, and a third lens group having a concave surface facing the image side.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings.

Figure 4:
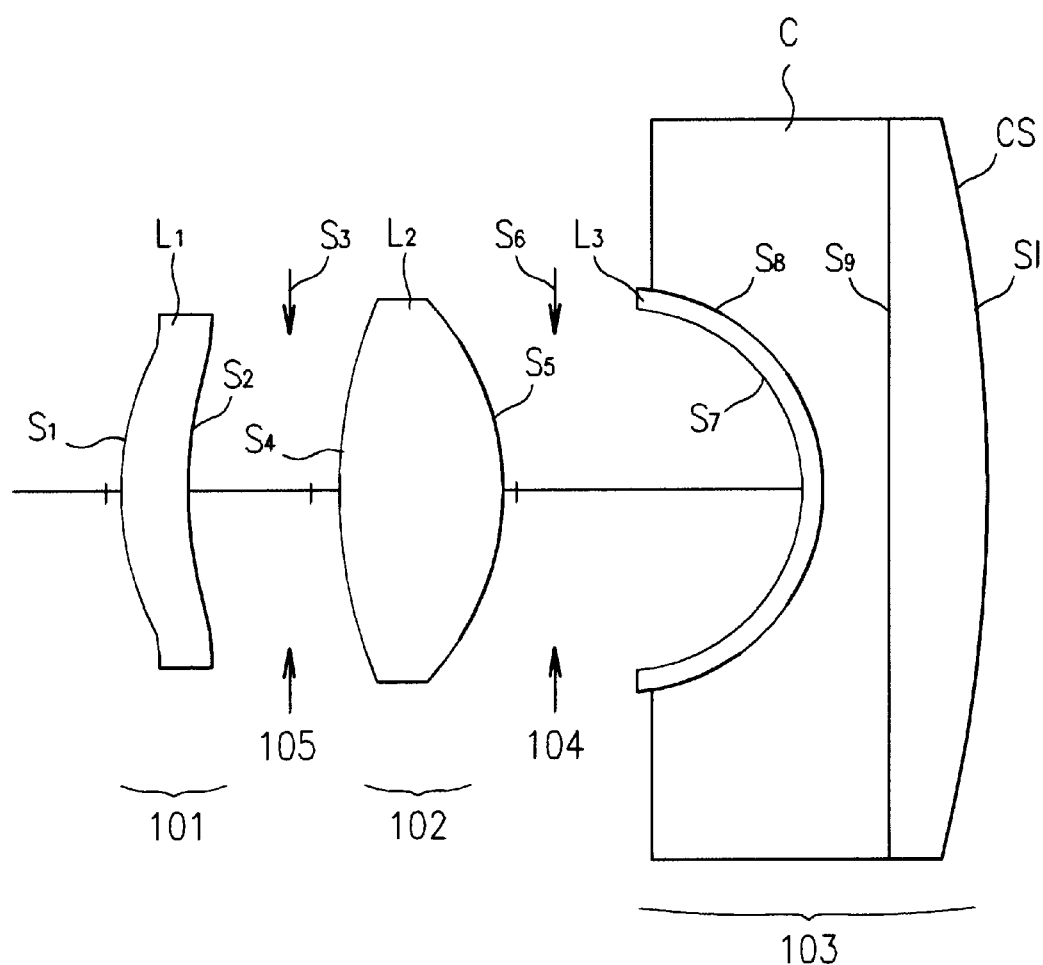
FIG. 4 is a side view of a projection lens according to a first preferred embodiment of the present invention.
Figure 5:
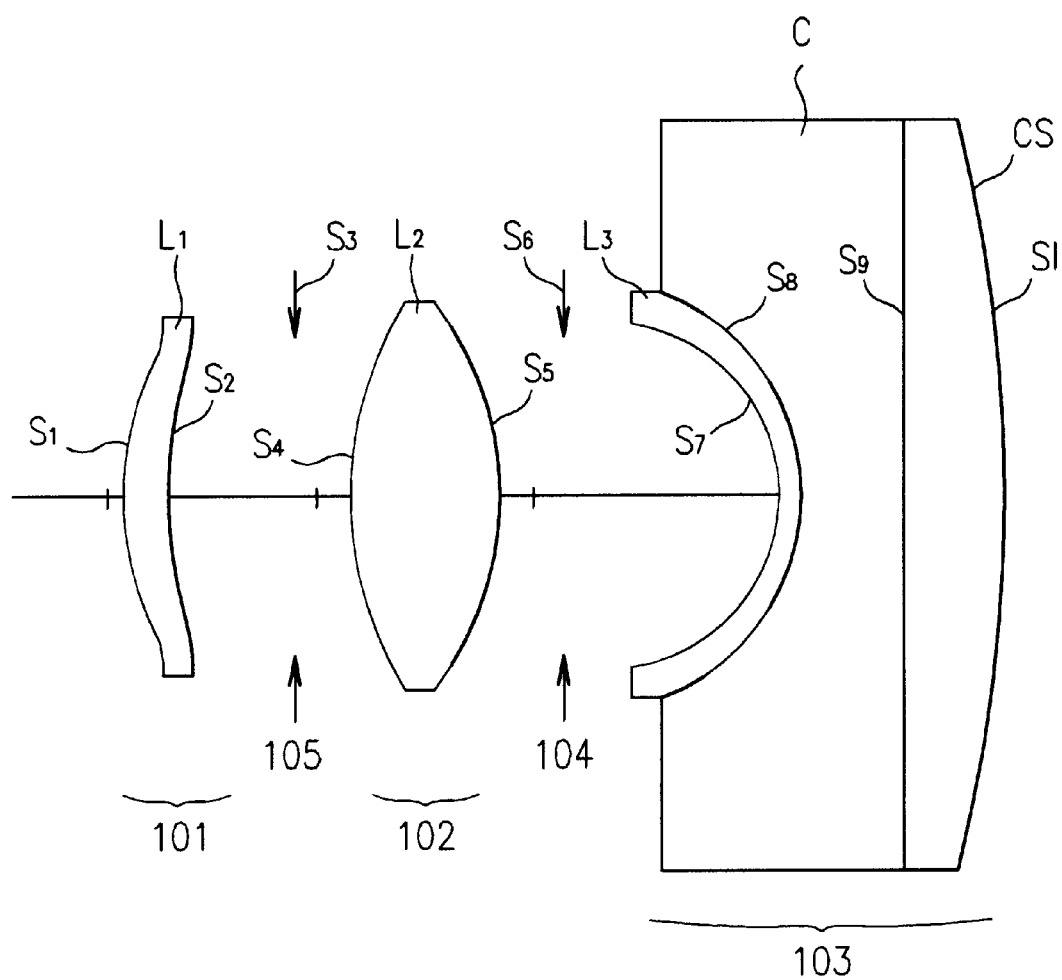
FIG. 5 is a side view of a projection lens according to a second preferred embodiment of the present invention.
Figure 6:
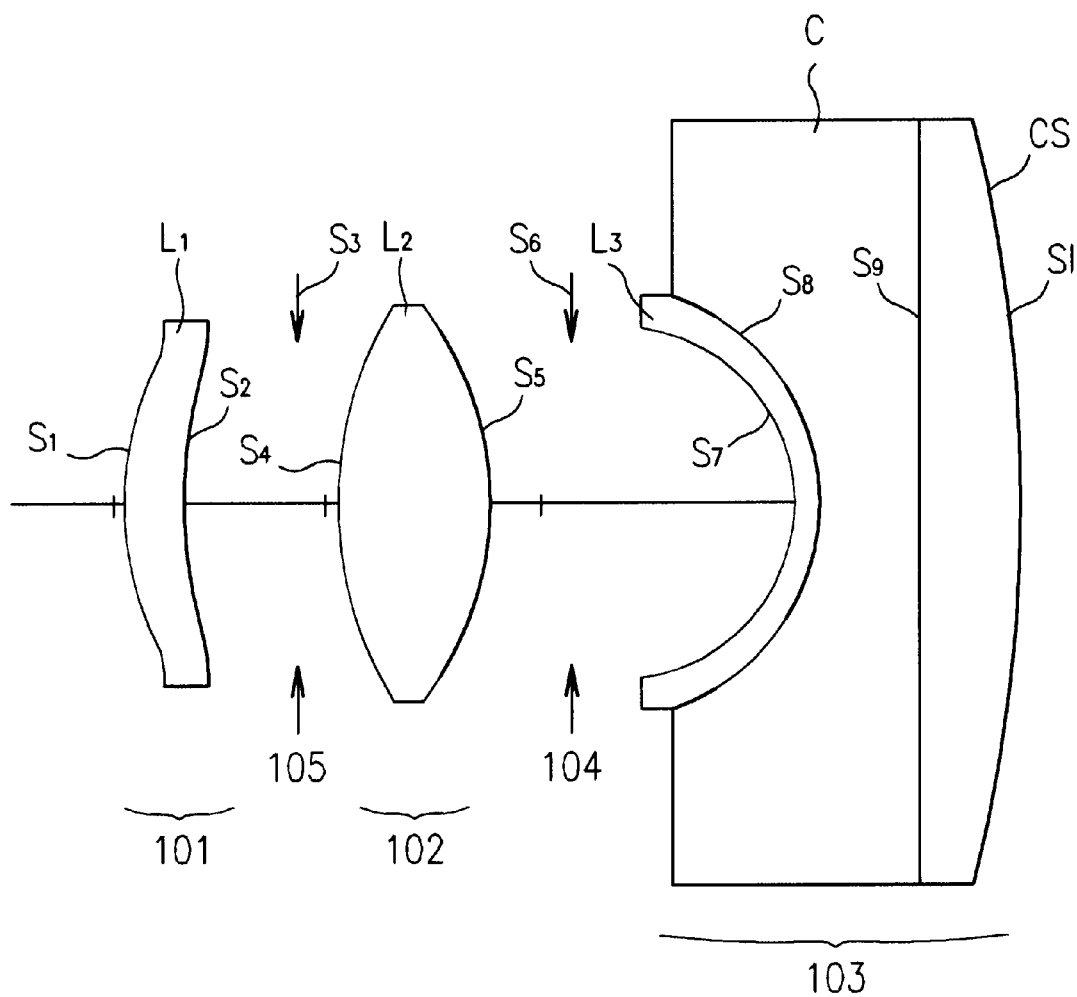
FIG. 6 is a side view if a projection lens according to a third preferred embodiment of the present invention.
Figure 7A:
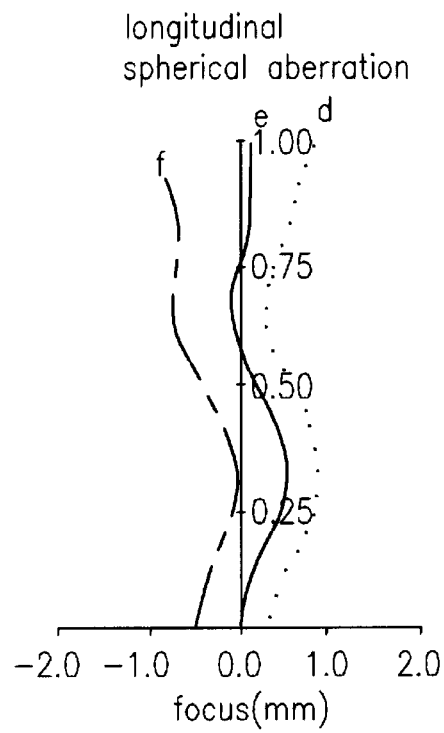
FIG. 7A is a graph illustrating spherical aberration exhibited by the projection lens of FIG. 4.
Figure 7B:
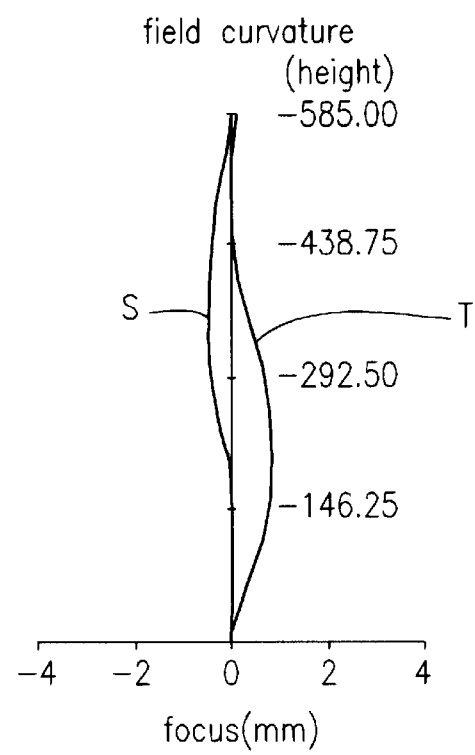
FIG. 7B is a graph illustrating field curvature aberration exhibited by the projection lens of FIG. 4.
Figure 8A:
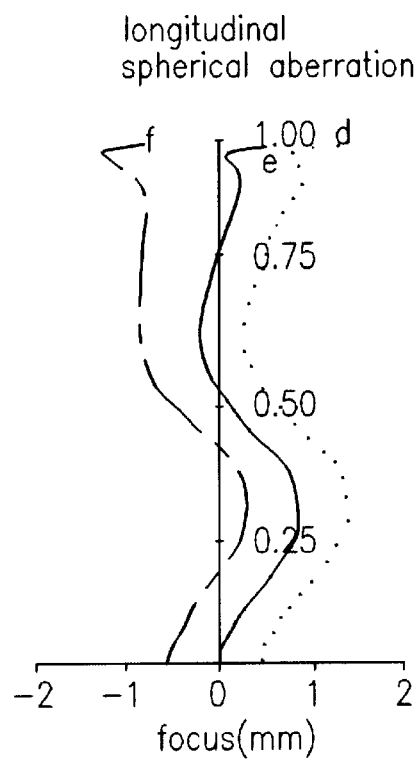
FIG. 8A is a graph illustrating spherical aberration exhibited by the projection lens of FIG. 5.
Figure 8B:
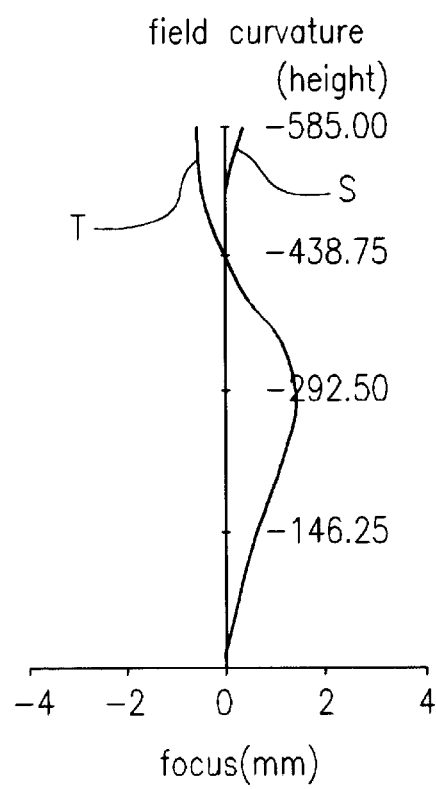
FIG. 8B is a graph illustrating field curvature aberration exhibited by the projection lens of FIG. 5.
Figure 9A:
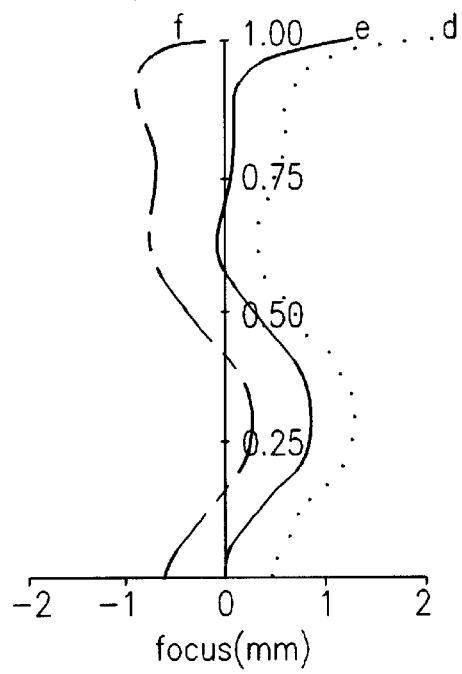
FIG. 9A is a graph illustrating spherical aberration exhibited by the projection lens of FIG. 6.
Figure 9B:
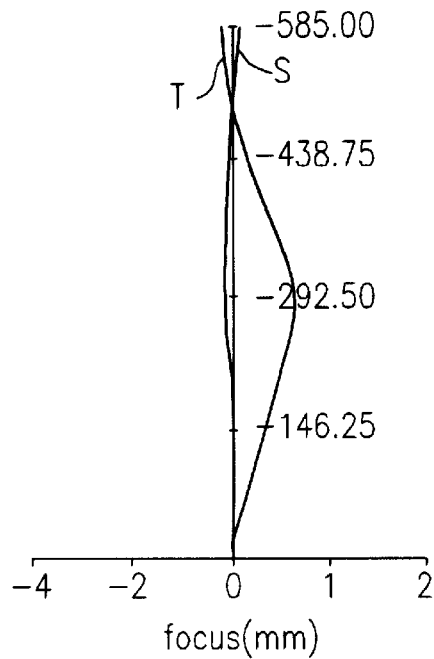
FIG. 9B is a graph illustrating field curvature aberration exhibited by the projection lens of FIG. 6.

As illustrated in FIGS. 4–6, embodiments 1–3 of the projection lens of the present invention include a first lens group 101 comprising a single convex lens element of generally positive meniscus form for removing aperture-dependent aberrations, a second lens group 102 comprising a single positive lens element that provides a majority of the positive power of the projection lens, a third lens group 103, with a strongly concave image-side surface, that provides correction for field-dependent aberrations, and a field stop 104, disposed between the second lens group 102 and the third lens group 103, for cutting off harmful or unwanted rays. A second field stop 105 may be optionally positioned between the first lens group 101 and the second lens group 102. FIGS. (7A and 7B), (8A and 8B) and (9A and 9B) show aberration plots for the projection lenses of FIGS. 4, 5 and 6, respectively.

Figure 10:
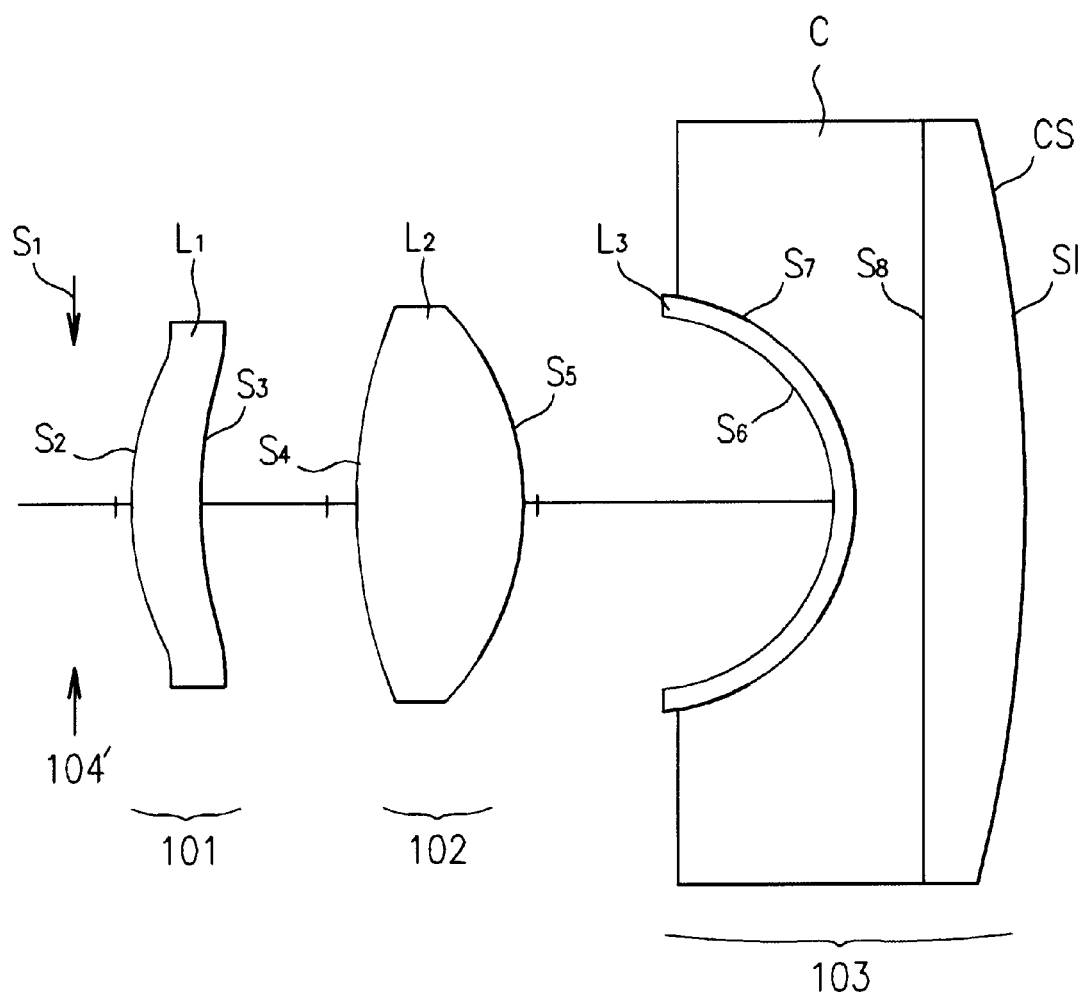
FIG. 10 is a side view of a projection lens according to a fourth preferred embodiment of the present invention.

Furthermore, as illustrated in FIG. 10, a fourth embodiment of the projection lens of the present invention includes a first lens group 101 comprising a single lens element of generally positive meniscus form that provides correction for aperture-dependent aberrations, a second lens group 102 comprising a single positive lens element that provides a majority of the positive power of the projection lens, a third lens group 103, with a strongly concave image-side surface, that provides correction for field-dependent aberrations, and a field stop 104, disposed in front of the first lens group, for cutting off harmful or unwanted rays.

The aforementioned lens elements are denoted by series-numbered reference codes $L_1$, $L_2$, and $L_3$. The surfaces of the lens elements are denoted by series-numbered reference codes $S_1$–$S_9$, and reference code SI. Reference code C denotes an optical coupler, preferably a liquid optical coupler.

As discussed above, the projection lens according to the present invention includes three lens groups, three lens elements, and at least one field stop to ensure stable performance over a large aperture, a high definition, a short focus, a large field angle and small temperature-induced focus variations.

To display a clear image of a CRT screen, the focal length per lens has to be short, which results in a large lens aperture and large aspheric surface aberration. Accordingly, a lens for removing aspheric surface aberration is required. This is accomplished by the meniscus-shaped aspheric lens element $L_1$, which has a convex surface facing an image side.

In order to obtain a predetermined magnification and to minimize temperature-induced focus variations, a lens with high optical power is required. This is provided by the biconvex lens element $L_2$ of the second lens group 102. The biconvex lens element $L_2$ is preferably made of a glass material that exhibits very low temperature-induced variation in its optical power.

The projection lens of the present invention allows the size of an HDTV set to be reduced. When the size of the HDTV is reduced, the field angle gets larger. Thus, the field curvature aberration and the distortion aberration become significant. The concave-shaped third lens element $L_3$ of the third lens group 103 help correct these aberrations. In addition, the aspheric surface $S_7$ on the screen, together with the curvature of the fluorescent plane SI of the CRT, also help to correct these aberrations.

Figure 1:
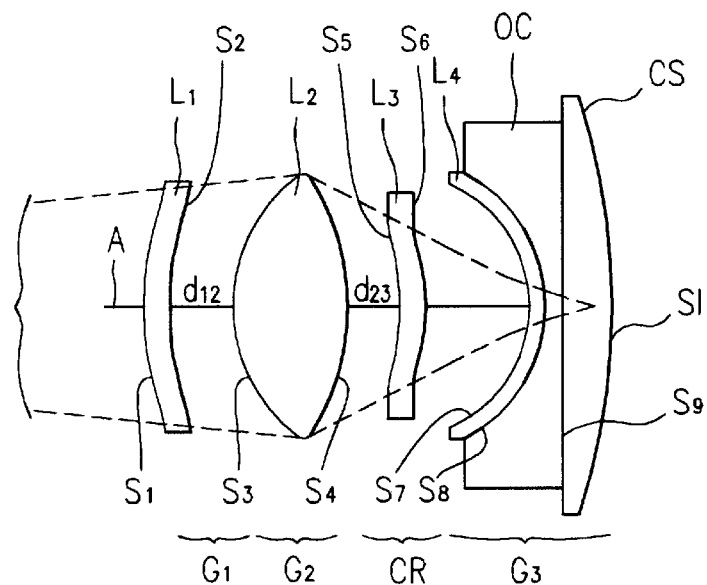
FIG. 1 is a side view of a related projection lens.
Figure 2A:
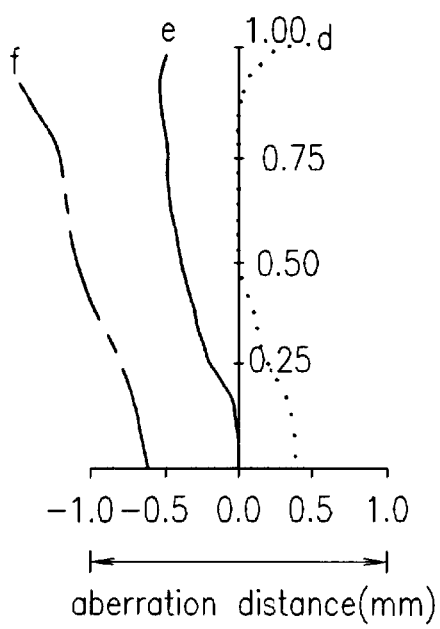
FIG. 2A is a graph illustrating spherical aberration exhibited by the projection lens of FIG. 1.
Figure 2B:
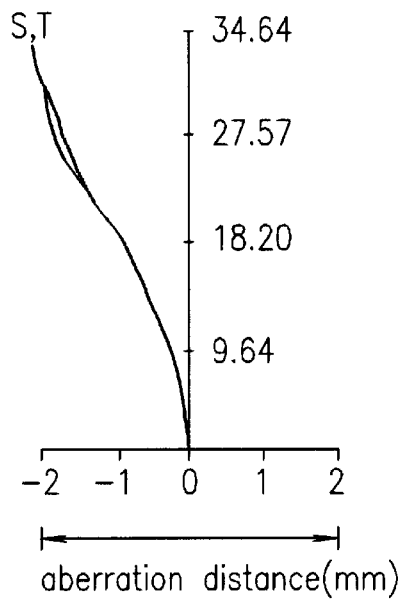
FIG. 2B is a graph illustrating field curvature aberration exhibited by the projection lens of FIG. 1.
Figure 2C:
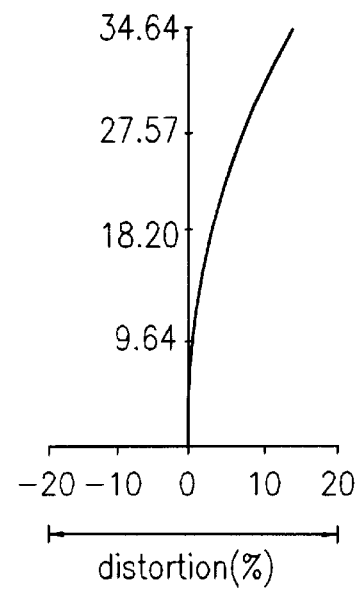
FIG. 2C is a graph illustrating distortion aberration exhibited by the projection lens of FIG. 1.
Figure 3A:
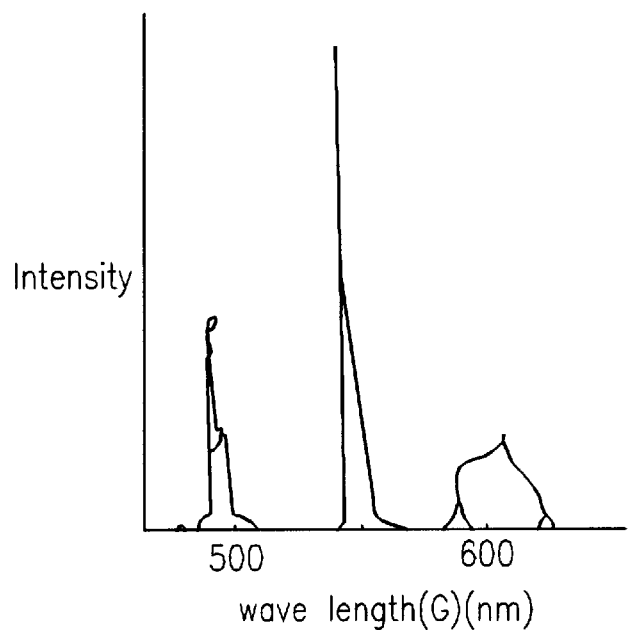
FIG. 3A is a graph illustrating the emission spectrum of a fluorescent plate of a green CRT.
Figure 3B:
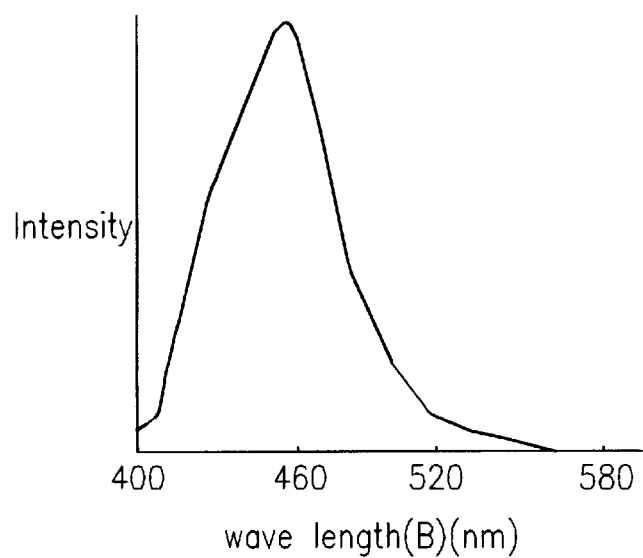
FIG. 3B is a graph illustrating the emission spectrum of a fluorescent plate of a blue CRT.
Figure 3C:
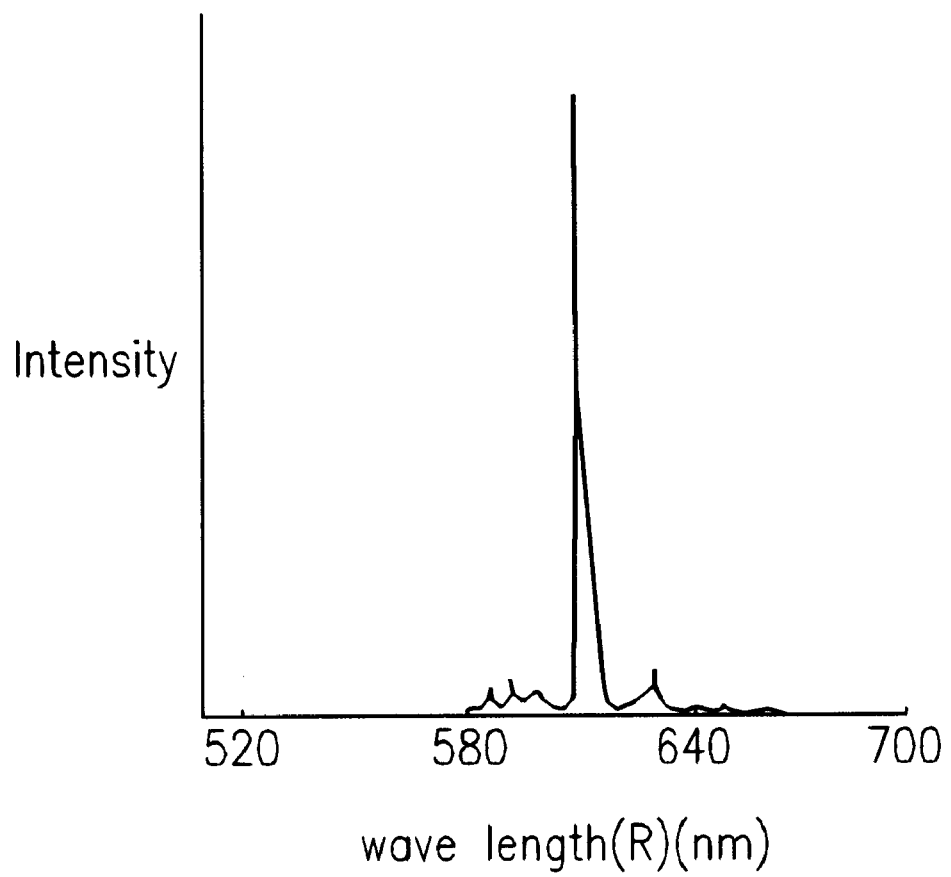
FIG. 3C is a graph illustrating the emission spectrum of a fluorescent plate of a red CRT.

The projection lenses of FIGS. 4–6 do not include the correction lens unit CR used in the related lens system of FIG. 1. This could result in coma aberration and residual high level aberration. Accordingly, the field stop 104 is preferably positioned between the second lens group 102 and the third lens group 103 to remove unwanted rays. Similarly, the field stop 104' is preferably positioned in front of the first lens group 101 of the projector lens of FIG. 10 to remove unwanted rays.

If the openings of the field stops 104 and 104' are too small they can block too many peripheral rays, thereby affecting the projected image. Thus, the size of the openings, e.g. height, of the field stops 104 and 104' is adjusted so that a sufficient number of peripheral rays are allowed to pass. In other words, the size and the position of the field stops 104 and 104' are adjusted to pass rays propagating along the optical axis, which control the focal length per lens, and to pass a minimum required number of peripheral rays. This removes the residual aberration, thereby improving the resolution of the projection lens.

In addition, since a plastic lens element exhibits temperature-induced optical power variations that are ten times higher than those exhibited by a glass lens, movement of the image plane occurs due to the temperature changes around the lens induced by a rise in the temperature of the CRT. This results in deterioration of the picture quality. Thus, the present projection lens includes a plastic aspheric surface, for correction of the aberration, in the first lens group 101 and the third lens group 103. Most of the optical power of the projection lens is provided in the second lens group 102, which is made of glass material, in order to minimize deterioration of performance due to temperature changes. Tables 1–3 list preferred lens element parameters for the projection lens of the present invention. Table 1 lists parameters for the embodiment of FIG. 4, Table 2 lists parameters for the embodiment of FIG. 5 and Table 3 lists parameters for the embodiment of FIG. 6.

TABLE 1

| Lens No. | Surface No. | Curvature Radius (mm) | Thickness & Distance (mm) | Refractive Index (n) |
|---|---|---|---|---|
| | image | infinity | 737.4 | |
| | $S_1$ | 55.842 | 10.0 | 1.492 |
| $L_1$ | $S_2$ | 99.254 | 14.92 | |
| | $S_3$ | infinity | 2.59 | |
| $ST_1$ | $S_4$ | 126.78 | 25.0 | 1.589 |
| $L_2$ | $S_5$ | −72.21 | 1.0 | |
| | $S_6$ | infinity | 41.99 | |
| $ST_2$ | $S_7$ | −62.341 | 4.0 | 1.492 |
| $L_3$ | $S_8$ | −45 | 9.0 | 1.440 |
| | $S_9$ | infinity | 14.1 | 1.563 |
| | SI | −350 | 0.0 | |

Aspheric Surface Constants for the Aspheric Lenses of Table 1

| No. | K | A | B | C | D | E | F |
|---|---|---|---|---|---|---|---|
| $S_1$ | 0.907 | −.134e − 5 | .901e − 9 | −.287e − 11 | .350e − 15 | .125e − 18 | −.155e − 21 |
| $S_2$ | −.919 | .207e − 5 | −.145e − 8 | .234e − 11 | −.392e − 14 | .182e − 17 | −.186e − 21 |
| $S_3$ | 1.434 | −.874e − 5 | .140e − 7 | −.246e − 10 | .253e − 13 | −.140e − 16 | .322e − 20 |

TABLE 2

| Lens No. | Surface No. | Curvature Radius (mm) | Thickness & Distance (mm) | Refractive Index (n) |
|---|---|---|---|---|
| | Image | infinity | 735.4 | |
| | $S_1$ | 57.376 | 8.0 | 1.492 |
| $L_1$ | $S_2$ | 110.76 | 17.86 | |
| | $S_3$ | infinity | 4.44 | |
| $ST_1$ | $S_4$ | 112.5 | 22.84 | 1.589 |
| $L_2$ | $S_5$ | −76.87 | 5.0 | |
| | $S_6$ | infinity | 34.42 | |
| $ST_2$ | $S_7$ | −49.873 | 3.5 | 1.492 |
| $L_3$ | $S_8$ | 50 | 14.45 | 1.440 |
| | $S_9$ | infinity | 14.1 | 1.563 |
| | SI | −350 | 0.0 | |

Aspheric Surface Constant for the Aspheric Lenses of Table 2

| No. | K | A | B | C | D | E | F |
|---|---|---|---|---|---|---|---|
| $S_1$ | -.405 | .460e - 6 | -.763e - 9 | .810e - 12 | -.173e - 14 | .281e - 19 | .270e - 21 |
| $S_2$ | 7.280 | .277e - 5 | -.887e - 8 | .191e - 10 | -.235e - 13 | .130e - 16 | -.283e - 20 |
| $S_3$ | .782 | -.456e - 5 | .112e - 7 | -.301e - 10 | .420e - 13 | -.288e - 16 | .803e - 20 |

TABLE 3

| Lens No. | Surface No. | Curvature Radius (mm) | Thickness & Distance (mm) | Refractive Index (n) |
|---|---|---|---|---|
| | Image | infinity | 737.6 | |
| $L_1$ | $S_1$ | 53.842 | 10.0 | 1.492 |
| | $S_2$ | 106.15 | 18.87 | |
| $ST_1$ | $S_3$ | infinity | 0.0 | |
| $L_2$ | $S_4$ | 113.89 | 24.65 | 1.589 |
| | $S_5$ | -76.07 | 5.0 | |
| $ST_2$ | $S_6$ | infinity | 31.85 | |
| $L_3$ | $S_7$ | -49.958 | 3.5 | 1.492 |
| | $S_8$ | -50 | 14.45 | 1.440 |
| | $S_9$ | infinity | 14.1 | 1.563 |
| | SI | -350 | 0.0 | |

Aspheric Surface Constants for the Aspheric Lenses of Table 3

| No. | K | A | B | C | D | E | F |
|---|---|---|---|---|---|---|---|
| $S_1$ | -.407 | .632e - 6 | -.145e - 8 | .195e - 11 | -.305e - 14 | .913e - 18 | .340e - 23 |
| $S_2$ | 6.335 | .302e - 5 | -.950e - 8 | .196e - 10 | -.238e - 13 | .131e - 16 | -.279e - 20 |
| $S_3$ | .744 | -.519e - 5 | .131e - 7 | -.350e - 10 | .490e - 13 | -.341e - 16 | .965e - 20 |

In Table 1–3, the curvature of the projection screen (image) corresponds to infinity, i.e., a plane. The space between the projection screen (image) and the front surface $S_1$ of the first lens element $L_1$ of the first lens group 101 is called the image space. This image space in air has a refractive index of 1.0. In addition, $ST_1$ and $ST_2$ refer to field stops 105 and 104, respectively.

The front surface $S_1$ of the first lens group 101 has a curvature of 55.842 mm and a thickness of 10.0 mm. The first lens $L_1$ has an optical power, i.e., refractive index, of 1.492 for the d-line.

The front surface $S_1$ of the first lens element $L_1$ is the aspheric surface. Aspheric surface constants K, A, B, C, D, E, and F can be expressed as the following aspheric surface equation:

$$x = \frac{Cv\varrho^2}{1 + [1 - (1 + x)Cv^2\varrho^2]^{1/2}} + A\varrho^4 + B\varrho^6 + C\varrho^8 + D\varrho^{10} + E\varrho^{12} + F\varrho^{14}, \quad (5)$$

where Cv is the curvature and $\varrho^2 = y^2 + z^2$.

In equation (5) above, the x coordinate axis is the optical axis. When a normal line of the lens is the y axis, the x value is the respective lens element values. The aspheric surface is preferably smooth to ensure easy workability and preciseness.

The projection lens according to the present invention has optimal performance when a CRT image raster size of 5.0"–5.5" is projected onto the projection screen at a magnification of 8–15 times. Since the projection lens of the present invention has a maximum field angle of 35° or more and the focal length per lens is 1.1 or below, it is possible to realize a projection TV having sufficient brightness. In addition, since the distance between the CRT screen CS and the phosphor surface SI of the third lens group 103 is very short, only a total reflection mirror can achieve a projection TV set having a small volume. In particular, the focal length of the projection lens is very short in the range of 73–80 mm.

The projection lens of the present invention preferably satisfies conditions (6), (7) and (8) below, to achieve good image pick-up performance:

$$0.30 < f_0/f_1 < 0.37; \quad (6)$$

$$0.90 < f_0/f_2 < 1.00; \text{ and} \quad (7)$$

$$0.60 < f_0/f_3 < -0.30; \quad (8)$$

where:
$f_0$ is the focal length of the overall lens system;
$f_1$ is the focal length of the first lens group;
$f_2$ is focal length of the second lens group; and
$f_3$ is focal length of the third lens group.

The above conditions differ from the distribution of optical power in the related art. When these conditions are satisfied, good image pick-up performance is achieved. Table 4 below lists the calculated values for conditions (6)–(8), for the preferred embodiments of the projection lens of the present invention.

TABLE 4

| Lens No. | $f_0/f_1$ | $f_0/f_2$ | $f_0/f_3$ | $f_0$ |
|---|---|---|---|---|
| $L_1$ | 0.315 | 0.929 | -0.364 | 75.81 |
| $L_2$ | 0.339 | 0.964 | -0.537 | 77.95 |
| $L_3$ | 0.345 | 0.966 | -0.539 | 77.38 |

The projection lens of the present invention preferably satisfies conditions (9) and (10) below, to ensure good performance and a sufficient number of peripheral rays:

$$0.50 < d_{12}/f_0 < 0.60; \text{ and} \quad (9)$$

$$0.50 < d_{23}/f_0 < 0.60 \quad (10)$$

where:
$f_0$ is the focal length of the overall lens system;
$d_{12}$ is the axial distance between principal planes of the first lens group and the second lens group 102; and
$d_{23}$ is the axial distance between principal planes of the second lens group and the third lens group 103.

The above condition shows the ratio of the distance between the principal planes of the respective lens groups, and is effective for correction of coma aberration in the peripheral field. If the condition is not satisfied, it is difficult to ensure a minimum quantity of peripheral rays, thereby causing the field curvature aberration. As a result, the performance of the projection lens is deteriorated. Table 5 below lists the calculated values for conditions (9) and (10) for the preferred embodiments of the projection lens of the present invention.

TABLE 5

| Lens No. | $d_{12}$ | $d_{23}$ | $d_{12}/f_0$ | $d_{23}/f_0$ |
| --- | --- | --- | --- | --- |
| $L_1$ | 42.34 | 42.10 | 0.557 | 0.555 |
| $L_2$ | 41.81 | 40.06 | 0.536 | 0.514 |
| $L_3$ | 41.99 | 39.16 | 0.543 | 0.506 |

The size of the field stops 104 and 104' preferably satisfy condition (11) below:

$$0.35 < H/f_0 < 0.55, \quad (11)$$

where H is the height of the field stop and $f_0$ is the focal distance of the overall projection lens. If the value of $H/f_0$ is less than 0.35, it is difficult to ensure a sufficient number of peripheral rays. If the value of $H/f_0$ is greater than 0.55, it is difficult to block unwanted rays.

The projection lens according to the present invention has the following advantages. First, since the correction of the an optical aberration, as well as optimal optical design, can be achieved by as few as three lens units and a simple field stop, the horizontal resolution required for HDTV can be realized. Second, since a smooth aspheric surface is applied to the plastic lens elements, it is easy to manufacture the plastic lens elements and manufacturing costs are reduced.

Thus, the projection lens of the present invention exhibits improved image pick-up performance and brightness, and can be used with a red CRT, a blue CRT, and a green CRT.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A projection lens, comprising successively from an image side to an object side:
    a first lens group comprising a single lens element of generally positive meniscus shape;
    a second lens group comprising a single positive lens element;
    a field stop; and
    a third lens group with a surface closest to the image side comprising a concave surface facing the image side.

2. The projection lens as claimed in claim 1, wherein the first lens group corrects for aperture-dependent optical aberrations.

3. The projection lens as claimed in claim 1, wherein the second lens group provides a majority of positive optical power exhibited by the projection lens.

4. The projection lens as claimed in claim 1, wherein the field stop reduces optical aberrations by blocking aberration-producing peripheral light rays.

5. The projection lens as claimed in claim 1, where the third lens group corrects for field-dependent optical aberrations.

6. The projection lens as claimed in claim 1, further comprising a second field stop positioned between the first and second lens groups.

7. The projection lens as claimed in claim 1, wherein the first lens group has at least one aspheric surface.

8. The projection lens as claimed in claim 1, wherein the third lens group has at least one aspheric surface.

9. The projection lens as claimed in claim 1, wherein the first lens group and the third lens group are made of a plastic material, and the second lens group is made of glass material.

10. The projection lens as claimed in claim 1, wherein the following conditions are satisfied:
    $0.30 < f_0/f_1 < 0.37$;
    $0.90 < f_0/f_2 < 1.00$; and
    $-0.60 < f_0/f_3 < -0.30$,
    where:
    $f_0$ is a focal length of the projection lens;
    $f_1$ is a focal length of the first lens group;
    $f_2$ is a focal length of the second lens group; and
    $f_3$ is a focal length of the third lens group.

11. The projection lens as claimed in claim 1, when the following conditions are satisfied:
    $0.50 < d_{12}/f_0 < 0.60$; and
    $0.50 < d_{23}/f_0 < 0.60$,
    where:
    $f_0$ is a focal length of the projection lens;
    $d_{12}$ is an axial distance between principal planes of the first lens group and the second lens group; and
    $d_{23}$ is an axial distance between principal planes of the second lens group and the third lens group.

12. The projection lens as claimed in claim 1, when the following condition is satisfied:
    $0.35 < H/f_0 < 0.55$,
    where:
    H is a height of the field stop; and
    $f_0$ is a focal length of the project lens.

13. A projection lens comprising successively from an image side to an object side:
    a field stop;
    a first lens group comprising a single lens element of generally positive meniscus shape;
    a second lens group comprising a single positive lens element; and
    a third lens group with a surface closest to the image side comprising a concave surface facing the image side.

14. The projection lens as claimed in claim 13, wherein the first lens group corrects for aperture-dependent optical aberrations.

15. The projection lens as claimed in claim 13, wherein the second lens group provides a majority of positive optical power exhibited by the projection lens.

16. The projection lens as claimed in claim 13, wherein the field stop reduces optical aberrations by blocking aberration-producing peripheral light rays.

17. The projection lens as claimed in claim 13, wherein the third lens group corrects for field-dependent optical aberrations.

18. The projection lens as claimed in claim 13, wherein the first lens group has at least one aspheric surface.

19. The projection lens as claimed in claim 13, wherein the third lens group has at least one aspheric surface.

20. The projection lens as claimed in claim 13, wherein the first lens group and the third lens group are made of a plastic material, and the second lens group is made of a glass material.

21. The projection lens as claimed in claim 13, wherein the following conditions are satisfied:
    $0.30 < f_0/f_1 < 0.37$;

$0.90 < f_0/f_2 < 1.00$; and $-0.60 < f_0/f_3 < -0.30$, where:

$f_0$ is a focal length of the projection lens;

$f_1$ is a focal length of the first lens group;

$f_2$ is a focal length of the second lens group; and $f_3$ is a focal length of the third lens group.

22. The projection lens as claimed in claim 13, wherein the following conditions are satisfied:

$0.50 < d_{12}/f_0 < 0.60$; and $0.50 < d_{23}/f_0 < 0.60$, where:

$f_0$ is a focal length of the projection lens;

$d_{12}$ is an axial distance between principal planes of the first lens group and the second lens group; and $d_{23}$ is axial distance between principal planes of the second lens group and the third lens group.

23. A projection lens, comprising successively from an image side to an object side:

a first lens group comprising a single lens element of generally positive meniscus shape;

a second lens group comprising a single positive lens element;

a field stop adapted to reduce chromatic aberration; and a third lens group having a concave surface facing the image side.

24. A projection lens comprising successively from an image side to an object side:

a field stop adapted to reduce chromatic aberration;

a first lens group comprising a single lens element of generally positive meniscus shape;

a second lens group comprising a single positive lens element; and a third lens group having a concave surface facing the image side.

* * * * *